United States Patent
Bhary et al.

(10) Patent No.: US 11,829,467 B2
(45) Date of Patent: Nov. 28, 2023

(54) DYNAMIC RULES ENGINE IN A CLOUD-BASED SANDBOX

(71) Applicant: Zscaler, Inc., San Jose, CA (US)

(72) Inventors: Nirmal Singh Bhary, Mohali (IN); Deepen Desai, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 911 days.

(21) Appl. No.: 16/776,868

(22) Filed: Jan. 30, 2020

(65) Prior Publication Data

US 2021/0192043 A1     Jun. 24, 2021

(30) Foreign Application Priority Data

Dec. 18, 2019   (IN) .............................. 201911052560

(51) Int. Cl.
*G06F 21/53* (2013.01)
*G06F 21/56* (2013.01)

(52) U.S. Cl.
CPC .............. *G06F 21/53* (2013.01); *G06F 21/56* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 7,062,680 B2 | 6/2006 | Sirbu | |
| 7,181,769 B1 | 2/2007 | Keanini et al. | |
| 7,392,543 B2 | 6/2008 | Szor | |
| 7,894,350 B2 | 2/2011 | Kailash et al. | |
| 7,899,849 B2 | 3/2011 | Chaudry et al. | |
| 8,171,554 B2 | 5/2012 | Elovici et al. | |
| 8,181,245 B2 | 5/2012 | Tripathi et al. | |
| 8,185,510 B2 | 5/2012 | Chaudry et al. | |
| 8,347,386 B2 | 1/2013 | Mahaffey et al. | |
| 8,365,259 B2 | 1/2013 | Chaudry et al. | |
| 8,402,539 B1 | 3/2013 | Chen et al. | |
| 8,413,238 B1 | 4/2013 | Sutton | |
| 8,413,239 B2 | 4/2013 | Sutton et al. | |
| 8,453,234 B2 | 5/2013 | Dawson et al. | |
| 8,464,335 B1 | 6/2013 | Sinha et al. | |
| 8,478,708 B1 | 7/2013 | Larcom | |

(Continued)

OTHER PUBLICATIONS

Elovici et al., "Applying Machine Learning Techniques for Detection of Malicious Code in Network Traffic," KI 2007, LNAI 4667, pp. 44-50.

(Continued)

*Primary Examiner* — Christopher C Harris
(74) *Attorney, Agent, or Firm* — Baratta Law PLLC; Lawrence A. Baratta, Jr.

(57) ABSTRACT

Computer-implemented systems and methods include receiving unknown content in a cloud-based sandbox; performing an analysis of the unknown content in the cloud-based sandbox, to obtain a score to determine whether or not the unknown content is malware; obtaining events based on the analysis; running one or more rules on the events; and adjusting the score based on a result of the one or more. The systems and methods can include classifying the unknown content as malware or clean based on the adjusted score. The analysis can include a static analysis and a dynamic analysis, with the events generated based thereon.

20 Claims, 9 Drawing Sheets

(56) References Cited

U.S. PATENT DOCUMENTS

| | | |
|---|---|---|
| 8,484,726 B1 | 7/2013 | Sutton |
| 8,510,838 B1 | 8/2013 | Sun et al. |
| 8,549,581 B1 | 10/2013 | Kailash et al. |
| 8,607,066 B1 | 12/2013 | Kailash et al. |
| 8,863,288 B1 | 10/2014 | Savage et al. |
| 9,223,972 B1 * | 12/2015 | Vincent ............... H04L 63/1425 |
| 9,917,855 B1 * | 3/2018 | Li ....................... H04L 63/1408 |
| 10,671,726 B1 * | 6/2020 | Paithane ............. H04L 63/1416 |
| 10,893,059 B1 * | 1/2021 | Aziz ....................... G06F 21/53 |
| 2005/0188272 A1 | 8/2005 | Bodorin et al. |
| 2006/0075500 A1 | 4/2006 | Bertman et al. |
| 2007/0266421 A1 | 11/2007 | Vaidya et al. |
| 2008/0098478 A1 | 4/2008 | Vaidya et al. |
| 2010/0031353 A1 | 2/2010 | Thomas et al. |
| 2010/0095277 A1 | 4/2010 | Cheng et al. |
| 2012/0079596 A1 | 3/2012 | Thomas et al. |
| 2012/0304244 A1 | 11/2012 | Xie et al. |
| 2013/0091571 A1 | 4/2013 | Lu et al. |
| 2013/0239214 A1 | 9/2013 | Klein et al. |
| 2013/0291087 A1 | 10/2013 | Kailash et al. |
| 2013/0305357 A1 | 11/2013 | Ayyagari et al. |
| 2013/0333032 A1 | 12/2013 | Delatorre et al. |
| 2013/0347094 A1 | 12/2013 | Bettini et al. |
| 2014/0090059 A1 | 3/2014 | Wang et al. |
| 2014/0208426 A1 * | 7/2014 | Natarajan ........... H04L 63/1441 726/23 |
| 2015/0096022 A1 * | 4/2015 | Vincent ................ G06F 21/562 726/23 |
| 2015/0319182 A1 * | 11/2015 | Natarajan ............... G06F 21/53 726/23 |
| 2017/0083703 A1 * | 3/2017 | Abbasi ................. G06F 21/561 |
| 2018/0046799 A1 * | 2/2018 | Kohavi ................... G06F 21/53 |
| 2020/0175152 A1 * | 6/2020 | Xu ......................... G06F 21/56 |
| 2020/0311268 A1 * | 10/2020 | Kostyushko .......... G06F 21/561 |
| 2020/0394299 A1 * | 12/2020 | Urias .................... G06F 21/566 |

OTHER PUBLICATIONS

Overton, Anti-Malware Tools: Intrusion Detection Systems, IBM, Apr. 30, 2005-May 3, 2005, pp. 1-22.

Van Randwyk et al., "Farm: An Automated Malware Analysis Environment", Security Technology, 2008, ICCST 2008, 42nd Annual IEEE International Carnahan Conference on IEEE, 2008, pp. 1-5.

Xie et al., "iPanda: A Comprehensive Malware Analysis Tool", Information Networking (ICOIN), 2013 International Conference on IEEE, 2013, pp. 1-6.

* cited by examiner

Dynamic Yara Hits
Dynamic Yara Hits

Win32_Banker_Trickbot_119723 {
mutantcreated:name:\Sessions\1\BaseNamedObjects\Global\789C000000010 ||
filedump:path:C:\Users\user\AppData\Roaming\ ||
processcreated:cmdline:C:\Windows\system32\svchost.exe}

FIG. 9

DYNAMIC RULES ENGINE IN A CLOUD-BASED SANDBOX

FIELD OF THE DISCLOSURE

The present disclosure relates generally to computer networking systems and methods. More particularly, the present disclosure relates to systems and methods for cloud-based malware behavior analysis via a dynamic rules engine in a cloud-based sandbox.

BACKGROUND OF THE DISCLOSURE

Malware, short for malicious software, is software used to disrupt computer operation, gather sensitive information, and/or gain access to private computer systems. It can appear in the form of code, scripts, active content, and other software. 'Malware' is a general term used to refer to a variety of forms of hostile or intrusive software. Malware includes, for example, computer viruses, ransomware, worms, Trojan horses, rootkits, key loggers, dialers, spyware, adware, malicious Browser Helper Objects (BHOs), rogue security software, and other malicious programs; the majority of active malware threats are usually worms or Trojans rather than viruses. As is widely known, there is a need for security measures to protect against malware and the like. Specifically, there is a need for zero-day/zero-hour protection against a rapidly morphing threat landscape. Security processing is moving to the Cloud including malware detection. For example, cloud-based malware protection is described in commonly-assigned U.S. Pat. Nos. 9,152,789 and 9,609,015, each entitled "Systems and methods for dynamic cloud-based malware behavior analysis," the contents of each are incorporated herein by reference.

With cloud-based malware protection, there needs to be a way to quickly detect malware and pass this detection on to provide zero-day/zero-hour protection. There are also needs to improve the efficacy of malware detection, provide malware attribution, improve scoring in malware detection, etc.

BRIEF SUMMARY OF THE DISCLOSURE

The present disclosure relates to systems and methods for cloud-based malware behavior analysis via a dynamic rules engine in a cloud-based sandbox. Computer-implemented systems and methods include receiving unknown content in a cloud-based sandbox; performing an analysis of the unknown content in the cloud-based sandbox, to obtain a score to determine whether or not the unknown content is malware; obtaining events based on the analysis; running one or more rules on the events; and adjusting the score based on a result of the one or more. The systems and methods can include classifying the unknown content as malware or clean based on the adjusted score. The analysis can include a static analysis and a dynamic analysis, with the events generated based thereon.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a server which may be used in the cloud-based system of FIG. 1 or the like;

FIG. 3 is a block diagram of a mobile device which may be used in the cloud-based system of FIG. 1 or the like;

FIG. 9 is a screenshot of a Dynamic YARA rule name and contextual information in a BA report.

DETAILED DESCRIPTION OF THE DISCLOSURE

Again, the present disclosure relates to systems and methods for cloud-based malware behavior analysis via a dynamic rules engine in a cloud-based sandbox. The systems and methods leverage a distributed, cloud-based security system to sandbox unknown content in the cloud, to install the unknown content for observation and analysis, and to leverage the results in the cloud for near immediate protection from newly detected malware. Computer-implemented systems and methods include receiving unknown content in a cloud-based sandbox; performing an analysis of the unknown content in the cloud-based sandbox, to obtain a score to determine whether or not the unknown content is malware; obtaining events based on the analysis; running one or more rules on the events; and adjusting the score based on a result of the one or more. The systems and methods can include classifying the unknown content as malware or clean based on the adjusted score. The analysis can include a static analysis and a dynamic analysis, with the events generated based thereon.

Example Cloud System Architecture

Figure 1:
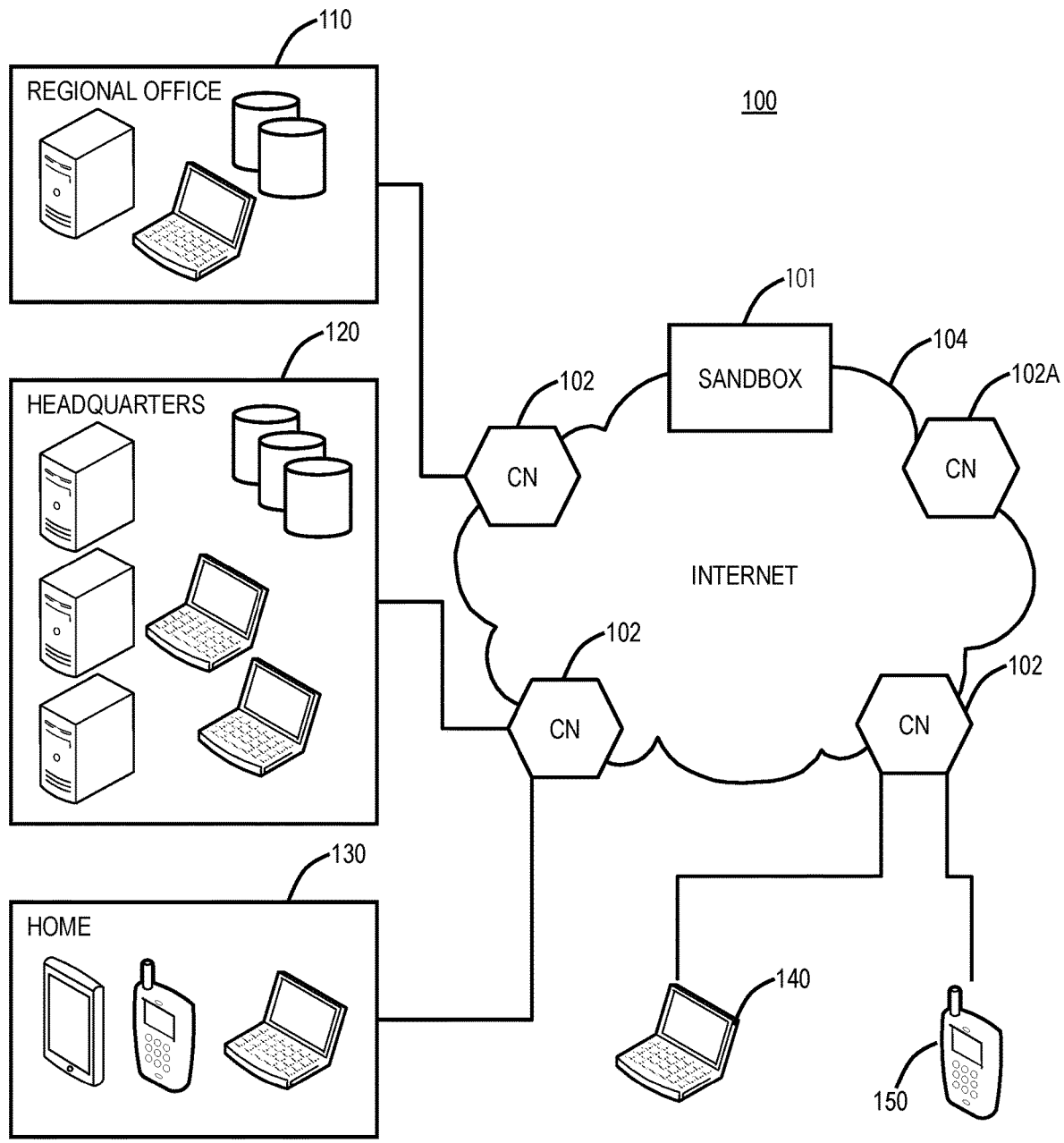
FIG. 1 is a network diagram of a cloud-based system for implementing various cloud-based service functions including a sandbox.
Figure 2:
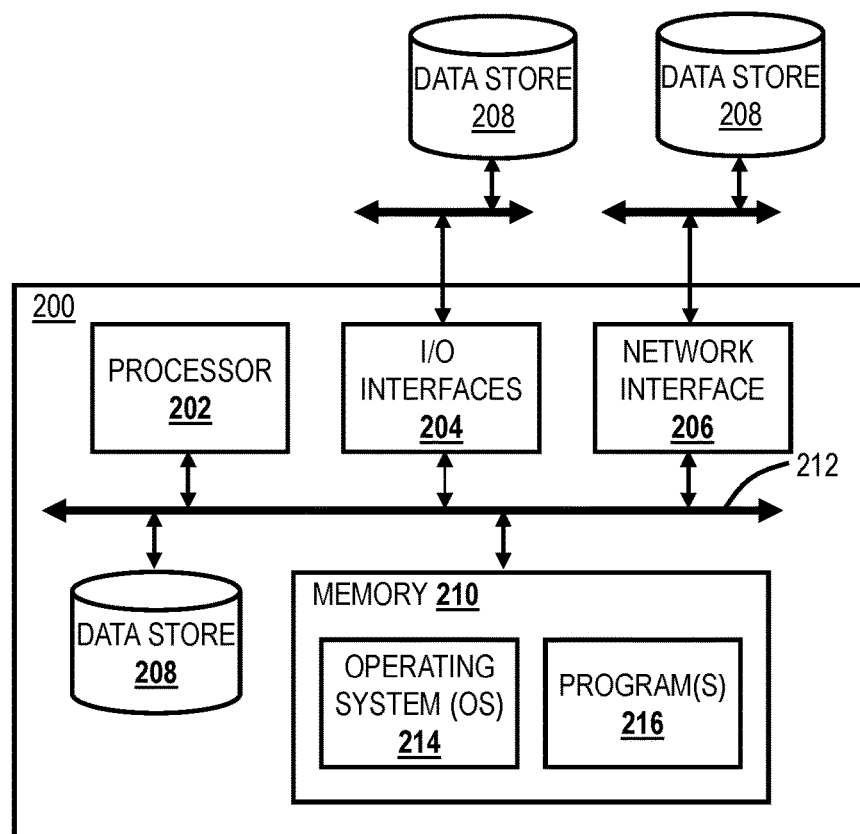

FIG. 1 is a network diagram of a cloud-based system 100 for implementing various cloud-based service functions including a sandbox 101. The cloud-based system 100 includes one or more cloud nodes (CN) 102 communicatively coupled to the Internet 104 or the like. The cloud nodes 102 may be implemented as a server 200 (as illustrated in FIG. 2) or the like, and can be geographically diverse from one another such as located at various data centers around the country or globe. For illustration purposes, the cloud-based system 100 can include a regional office 110, headquarters 120, various employee's homes 130, laptops/desktops 140, and mobile devices 150 each of which can be communicatively coupled to one of the cloud nodes 102. These locations 110, 120, 130 and devices 140, 150 are shown for illustrative purposes, and those skilled in the art will recognize there are various access scenarios to the cloud-based system 100 all of which are contemplated herein.

Again, the cloud-based system 100 can provide any functionality through services such as Software as a Service (SaaS), Platform as a Service (PaaS), Infrastructure as a Service (IaaS), Security as a Service, Virtual Network Functions (VNFs) in a Network Functions Virtualization (NFV) Infrastructure (NFVI), etc. to the locations 110, 120, 130 and devices 140, 150. The cloud-based system 100 is replacing the conventional deployment model where network devices are physically managed and cabled together in sequence to deliver the various services associated with the network devices. The cloud-based system 100 can be used to implement these services in the cloud without end-users requiring the physical devices and management thereof. The cloud-based system 100 can provide services via VNFs (e.g., firewalls, Deep Packet Inspection (DPI), Network Address Translation (NAT), etc.). VNFs take the responsibility of handling specific network functions that run on one or more virtual machines (VMs), software containers, etc., on top of the hardware networking infrastructure—routers, switches, etc. Individual VNFs can be connected or combined together as building blocks in a service chain to offer a full-scale networking communication service.

Two example services include Zscaler Internet Access (ZIA) (which can generally be referred to as Internet Access (IA)) and Zscaler Private Access (ZPA) (which can generally be referred to as Private Access (PA)), from Zscaler, Inc. (the assignee and applicant of the present application). The IA service can include firewall, threat prevention, DPI, Data Leakage Prevention (DLP), and the like. The PA can include access control, microservice segmentation, etc. For example, the IA service can provide a user with Internet Access, and the PA service can provide a user with access to enterprise resources in lieu of traditional Virtual Private Networks (VPNs).

Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein contemplate operation with any cloud-based system.

In an embodiment, the cloud-based system 100 can be a distributed security system or the like. Here, in the cloud-based system 100, traffic from various locations (and various devices located therein) such as the regional office 110, the headquarters 120, various employee's homes 130, laptops/desktops 140, and mobile devices 150 can be monitored (e.g., inline) or redirected to the cloud through the cloud nodes 102. That is, each of the locations 110, 120, 130, 140, 150 is communicatively coupled to the Internet 104 and can be monitored by the cloud nodes 102. The cloud-based system 100 may be configured to perform various functions such as spam filtering, Uniform Resource Locator (URL) filtering, antivirus protection, bandwidth control, DLP, zero-day vulnerability protection, web 2.0 features, and the like. In an embodiment, the cloud-based system 100 may be viewed as Security-as-a-Service through the cloud, such as the IA. For example, the cloud-based system 100 can be used to block or allow access to web sites, files, streaming services, etc. Such access control can be based in part on the systems and methods described herein to identify malware through sandboxing.

Advantageously, the cloud-based system 100, when operating as a distributed security system, avoids platform-specific security apps on the mobile devices 150, forwards web traffic through the cloud-based system 100, enables network administrators to define policies in the cloud, and enforces/cleans traffic in the cloud prior to delivery to the mobile devices 150. Further, through the cloud-based system 100, network administrators may define user-centric policies tied to users, not devices, with the policies being applied regardless of the device used by the user. The cloud-based system 100 provides 24×7 security with no need for updates as the cloud-based system 100 is always up to date with current threats and without requiring device signature updates. Also, the cloud-based system 100 enables multiple enforcement points, centralized provisioning, and logging, automatic traffic routing to the nearest cloud node 102, the geographical distribution of the cloud nodes 102, policy shadowing of users which is dynamically available at the cloud nodes 102, etc.

In an embodiment, each of the cloud nodes 102 may include a decision system, e.g., data inspection engines that operate on a content item, e.g., a Web page, a file, an email message, or some other data or data communication that is sent from or requested by a user device 300. In an embodiment, all data destined for or received from the Internet 104 is processed through one of the cloud nodes 102. In another embodiment, specific data specified by policy, e.g., only email, only executable files, etc., is processed through one of the cloud nodes 102.

Each of the cloud nodes 102 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the cloud node 102 may allow the distribution of the content item, preclude distribution of the content item, allow distribution of the content item after a cleaning process, or perform threat detection on the content item. In an embodiment, the actions taken by one of the cloud nodes 102 may be determinative on the threat classification of the content item and on a security policy of the external system to which the content item is being sent from or from which the content item is being requested by. A content item is violating if, for any part $C=[c1, c2, \ldots, cm]$ of the content item, at any of the cloud nodes 102, any one of the data inspection engines generates an output that results in a classification of "violating."

In an embodiment, one or more of the cloud nodes 102 can be a Central Authority (CA) node 102A that communicates with the other cloud nodes 102. The CA nodes 102A may store policy data for each user and may distribute the policy data to each of the cloud nodes 102. The policy may, for example, define security policies for a protected system, e.g., security policies for an enterprise. Example policy data may define access privileges for users, web sites, and/or content that is disallowed, restricted domains, etc. The CA nodes 102A may distribute the policy data to the cloud nodes 102. In an embodiment, the CA nodes 102A may also distribute threat data that includes the classifications of content items according to threat classifications, e.g., a list of known viruses, a list of known malware sites, spam email domains, a list of known phishing sites, known malware content, etc. The distribution of threat data between the CA nodes 102A and the cloud nodes 102 may be implemented by a push and pull distribution schemes described in more detail below. In an embodiment, the CA nodes 102A can continually update the cloud nodes 102 with newly detected malware as described herein through the sandbox 101 for zero-day/zero-hour protection.

Example Server Architecture

FIG. 2 is a block diagram of a server 200 which may be used in the cloud-based system 100, in other systems, or standalone. For example, the cloud nodes 102 may be formed as one or more of the servers 200. The server 200 may be a digital computer that, in terms of hardware architecture, generally includes a processor 202, Input-Output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 3:
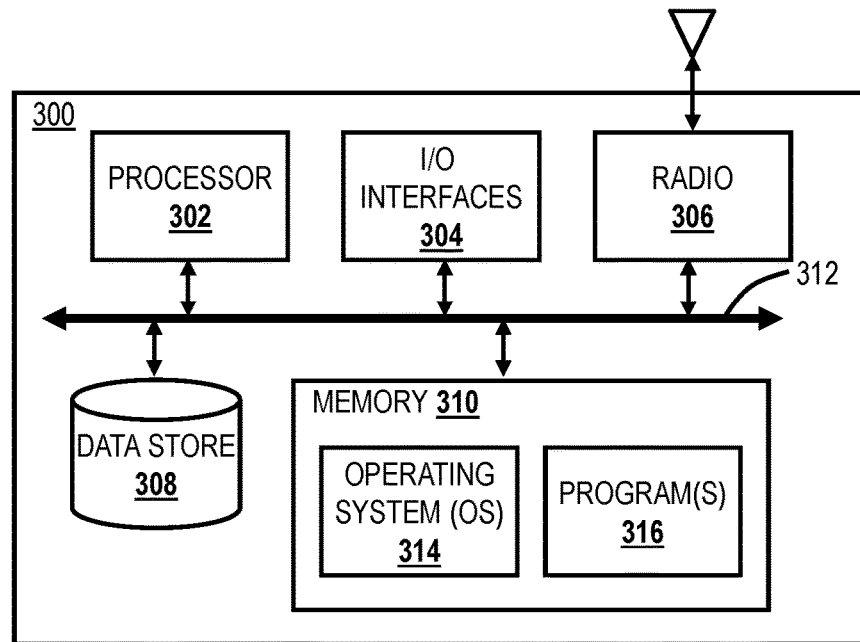

FIG. 3 is a block diagram of a user device 300, which may be used in the cloud-based system 100 or the like. Again, the user device 300 can be a smartphone, a tablet, a smartwatch, an Internet of Things (IoT) device, a laptop, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 3 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable Operating System (O/S) 314 and programs 316. The operating system 314 essentially controls the execution of other computer programs, and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Cloud-Based Sandboxing

Figure 4:
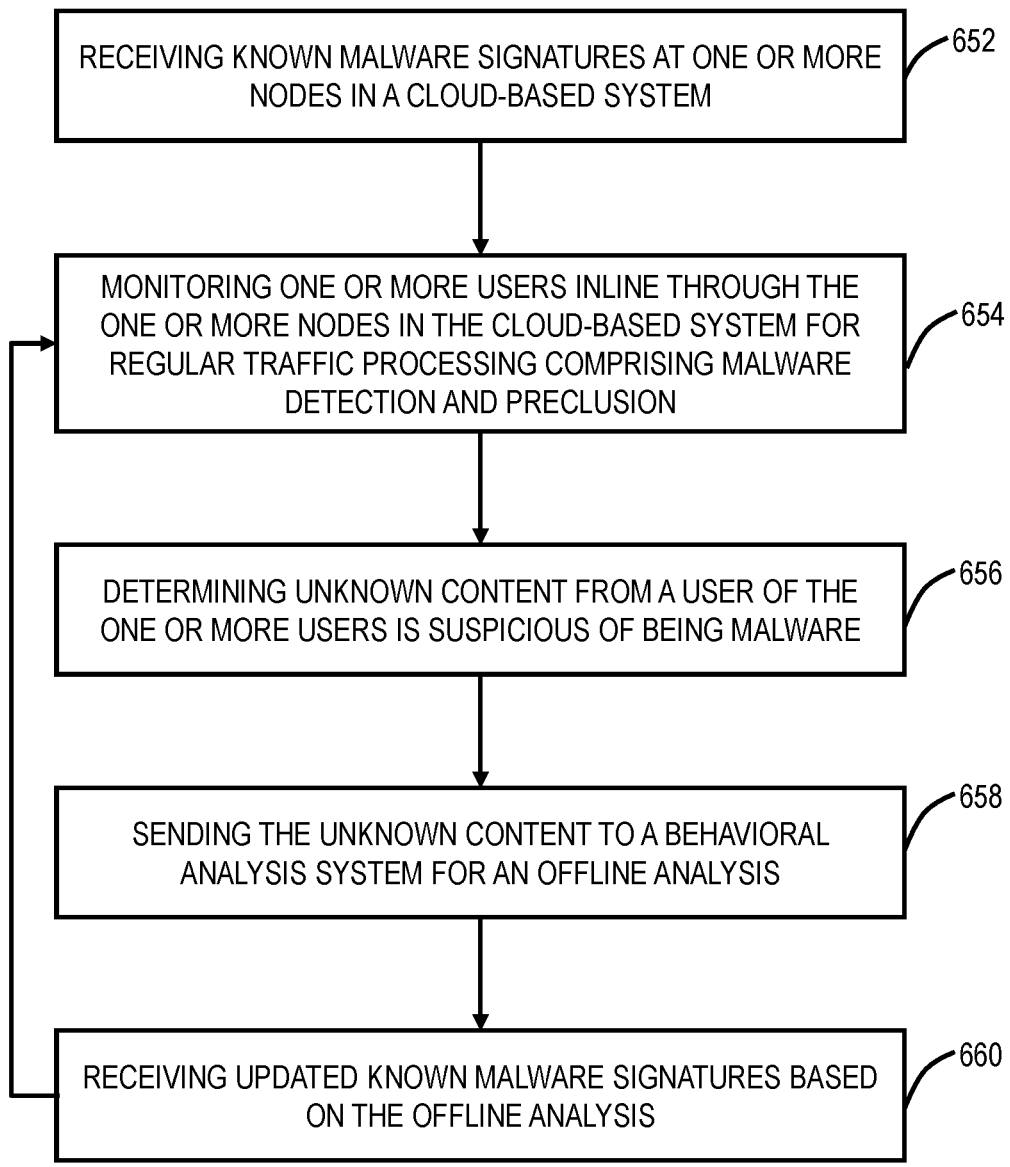
FIG. 4 is a flowchart of a behavioral analysis method in the cloud.

FIG. 4 is a flowchart of a behavioral analysis method 650 in the cloud. The behavioral analysis method 650 can be implemented through the BA system 600 with any cloud-based system. The cloud-based method 650 includes receiving known malware signatures at one or more nodes in a cloud-based system (step 652). The cloud-based method 650 includes monitoring one or more users inline through the one or more nodes in the cloud-based system for regular traffic processing comprising malware detection and preclusion (step 654). Note, the cloud-based system can also monitor for other security aspects (e.g., viruses, spyware, data leakage, policy enforcement, etc.). The cloud-based method 650 includes determining unknown content from a user of the one or more users is suspicious of being malware (step 656). The cloud-based method 650 includes sending the unknown content to a behavioral analysis system for an offline analysis (step 658). Finally, the cloud-based method 650 includes receiving updated known malware signatures based on the offline analysis (step 660).

The cloud-based method 650 can include performing one of blocking or allowing the unknown content to or from the user based on policy. The one or more users can include a plurality of users associated with a plurality of companies, and the cloud-based method 650 can further include receiving a policy setting for each of the plurality of companies, wherein the policy setting comprises whether or not to perform the offline analysis for the unknown content; and performing the regular traffic processing for the unknown content for users associated with companies with the policy setting of not performing the offline analysis, wherein the regular traffic processing comprises monitoring for malware based on the offline analysis of other users. The cloud-based method 650 can include determining unknown content is suspicious based on an analysis in the one or more nodes based on smart filtering determining that the unknown content is an unknown, active software file that performs some functionality on the user's device. The cloud-based method 650 can include storing the unknown content in the behavioral analysis system and maintaining an event log associated with the unknown content in the behavioral analysis system; and performing the offline analysis on the unknown content comprising a static analysis and a dynamic analysis. The unknown content can be stored in an encrypted format, and the cloud-based method 650 can include storing results data from various stages of the offline analysis of the unknown content, wherein the results data includes static analysis results, JavaScript Object Notation (JSON) data from the dynamic analysis, packet capture data, screenshot images, and files created/deleted/downloaded during the dynamic analysis.

The static analysis can evaluate various properties of the unknown content, and the dynamic analysis runs the unknown content on a virtual machine operating an appropriate operating system for the unknown content. The cloud-based method 650 can include performing the offline analysis as a combination of a static analysis and a dynamic analysis by the behavioral analysis system. The static analysis can evaluate various properties of the unknown content using a set of tools based on a type of file of the unknown content, wherein the set of tools comprise any of checking third party services to match the unknown content to known viruses detected by various anti-virus engines, using a Perl Compatible Regular Expressions (PCRE) engine to check the unknown content for known signatures, identifying code signing certificates to form a whitelist of known benign content using Portable Executable (PE)/Common Object File Format (COFF) specifications, and evaluating destinations of any communications from the dynamic analysis. The dynamic analysis can run the unknown content on a virtual machine operating an appropriate operating system for the unknown content and evaluates any of JavaScript Object Notation (JSON) data generated; temporary files generated, system and registry files modified; files added or deleted; processor, network, memory and file system usages; external communications; security bypass; data leakage; and persistence.

Sandbox System

Figure 5:
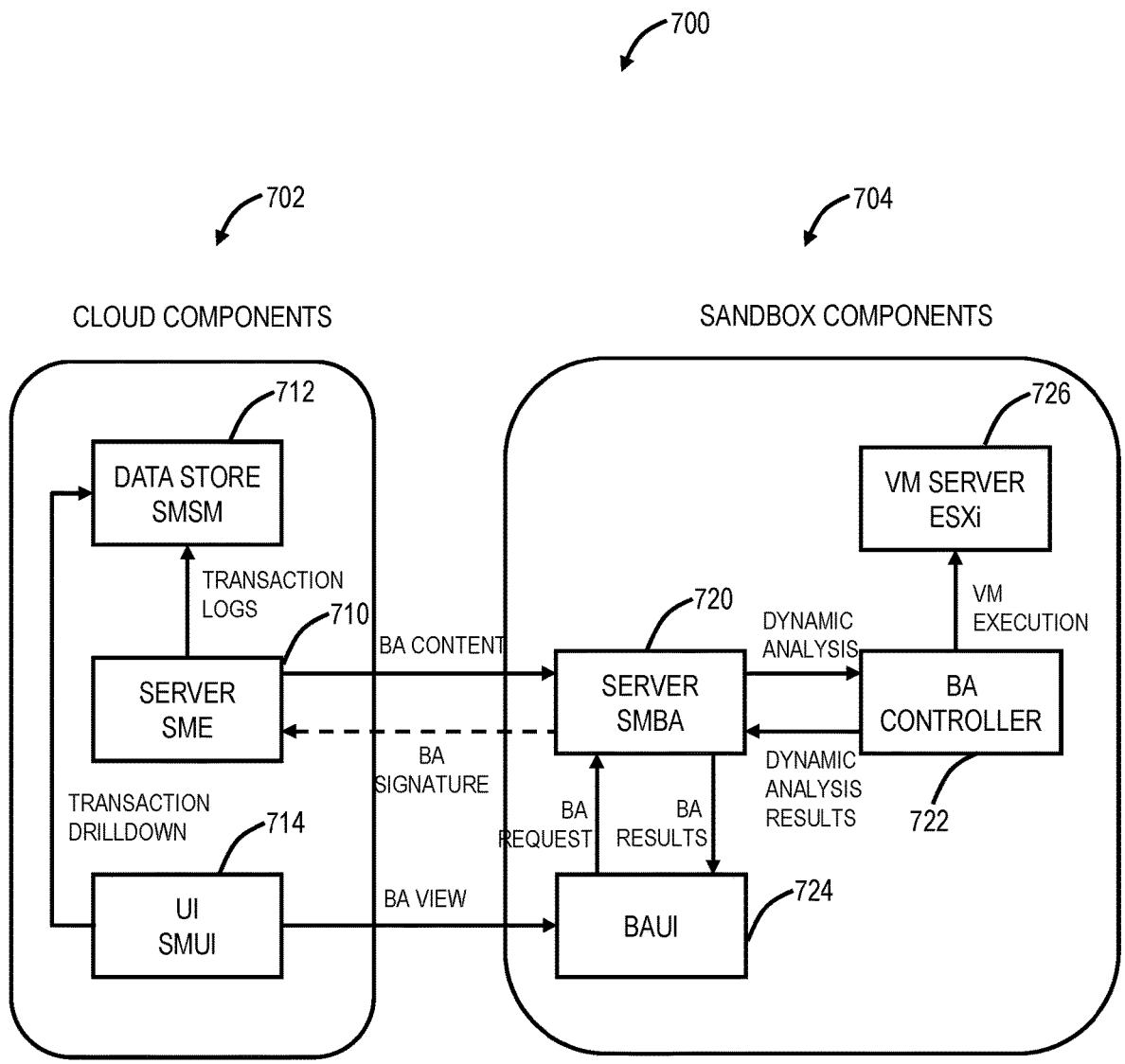
FIG. 5 is a block diagram of an example implementation of a Behavioral Analysis (BA) system for use with the cloud-based system or any other cloud-based system.

FIG. 5 is a block diagram of an example implementation of a Behavioral Analysis (BA) system 700 for use with the cloud-based system 100 or any other cloud-based system. FIG. 5 is presented as an example implementation for the sandbox 101, and those of ordinary skill in the art will appreciate other implementations providing similar functionality are also contemplated. The BA system 700 can include cloud components 702 and sandbox components 704. The cloud components 702 can include the cloud nodes 102, etc. The cloud components 702 are generally used to monitor users in the cloud, to detect known malware, to provide unknown files that could be malware to the sandbox components 704, and to receive updates to known malware from the sandbox components 704. The sandbox components 704 are generally configured to receive unknown files and determine whether they are malicious (malware) or benign and provide this information to the cloud components 702. The sandbox components 704 can perform a static analysis and a dynamic analysis of the unknown files in an offline manner whereas the cloud components 702 are configured to detect malware inline. As described herein, the sandbox components 704 can also be referred to as BA infrastructure.

Figure 6:
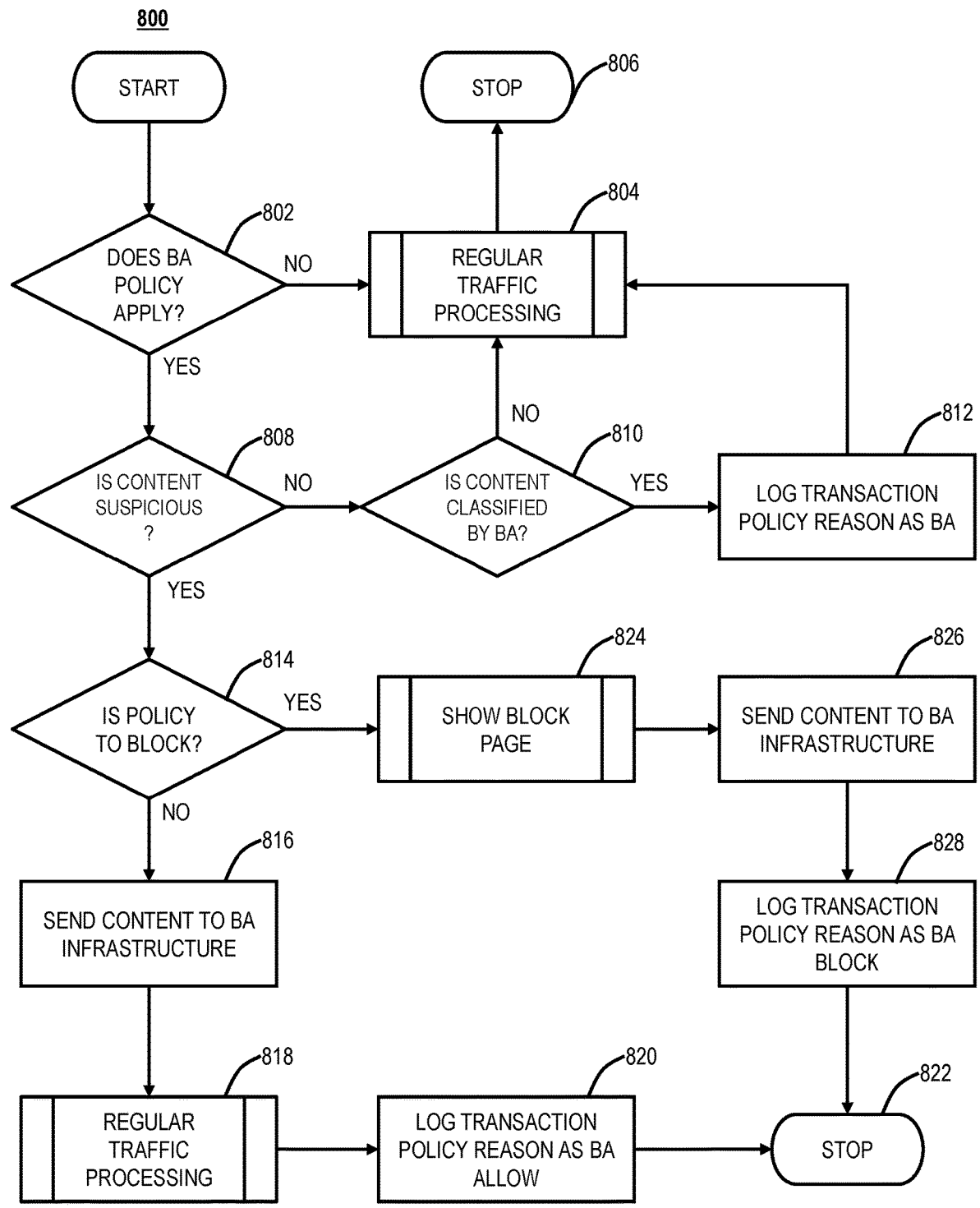
FIGS. 6-8 are flowcharts of example operational methods associated with the BA system of FIG. 5 including methods performed by the server in the cloud components (FIG. 6), the server in the sandbox components (FIG. 7), and the BA controller (FIG. 8)
Figure 7:
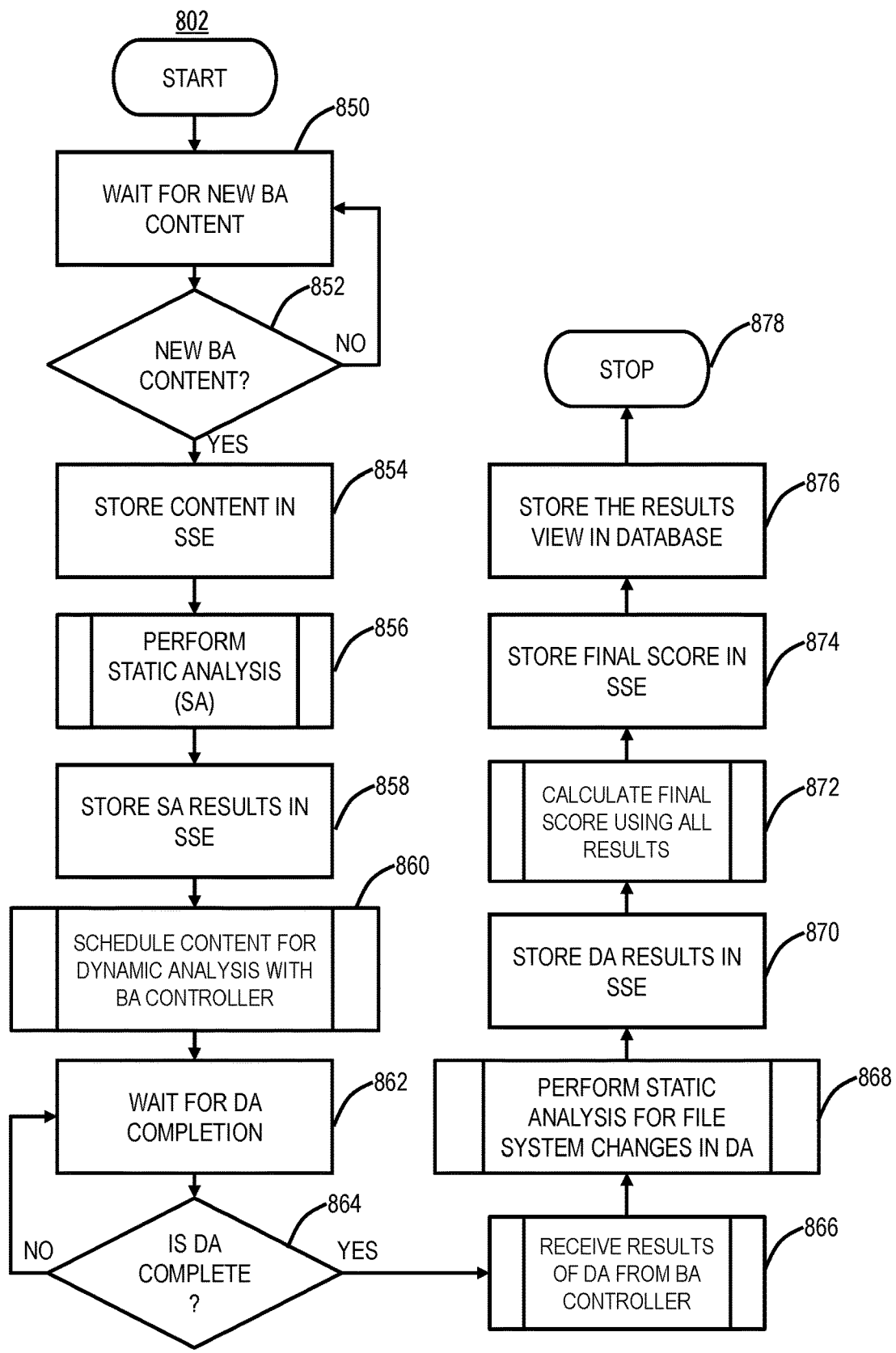
Figure 8:
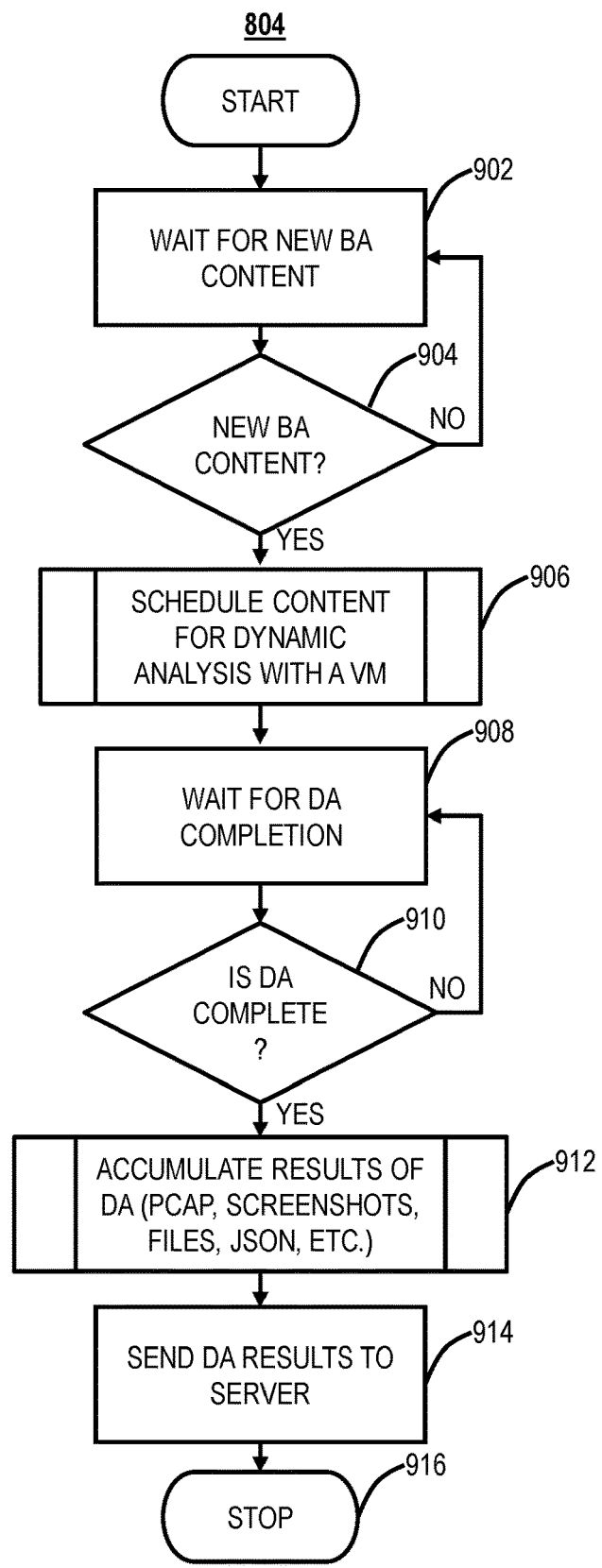

The cloud components 702 can include a server 710 (or plurality of servers 710), a data store 712, and a user interface (UI) 714. The server 710 can include the processing nodes 110, the cloud nodes 502, etc. and the server 710 is generally the initiator and final consumer of results from the BA system 700, i.e. the server 710 inter alia detects and precludes malware as well as flagging unknown files for BA analysis by the BA system 700. The data store 712 can be a storage mechanism for all transaction logs and reporting mechanisms. The UI 714 can provide the ability to configure BA policies as well as turning it on/off at a company level. It is also the gateway to all reports and forensic analysis. The sandbox components 704 can include a server 720, a BA controller 722, a BAUI 724, and a Virtual Machine (VM) server 726. The server 720 provides a gateway to the BA infrastructure in the sandbox components 704 and acts a consolidated secure (encrypted) storage server for BA content. The BA controller 722 provides sandboxing functionality for performing dynamic analysis of BA content. The BAUI 724 provides a user interface to view the analysis results of BA content. Finally, the VM server 726 provides a VM infrastructure used by the BA controller 722 for dynamic analysis of BA content. Note, the cloud components 702 and the sandbox components 704, as described herein, can be a combination of hardware, software, and/or firmware for performing the various functionality described herein. FIGS. 6-8 are flowcharts of example operational methods 800, 802, 804 performed by the server 710 (FIG. 6), the server 720 (FIG. 7), and the BA controller 722 (FIG. 8).

Variously, the sandbox components 704 are configured to distribute known malware signatures to the cloud components 702, e.g., the distributed cloud enforcement nodes. The cloud components 702 monitor inline users such as using HTTP and non-HTTP protocols (to cover proxy and firewall/DPI) to detect and block/preclude malware. In addition, the cloud components 702 perform intelligent collection of unknown malware from distributed cloud enforcement nodes. The enforcement nodes decide what is unknown malware—smart filtering based on signatures and static/dynamic analysis criteria that can be performed quickly inline and send it securely and efficiently to BA Analysis engine in the cloud, i.e. the sandbox components 704. The sandbox components 704 is a BA Analysis Engine which includes secure content storage with data destruct capabilities, is a scalable and flexible platform for VM based execution sandboxes, includes a smart scheduler to determine what needs to be analyzed and manage BA content from the cloud, and includes threat reporting storage and UI infrastructure for malware result analysis and research. The sandbox components 704 can provide dynamic updates based on latest malware analysis thereby providing zero-day/zero-hour protection.

FIG. 6 illustrates an operational method 800 performed by the cloud components 702, such as the server 710. The server 710 is the initiator for the BA logic sequence. Generally, the server 710 is configured to process policy information related to BA, and this can be managed with flags to enable/disable the feature at the company level. The server 710 is further configured to consume signatures (related to BA) that are created by the BA infrastructure, i.e. the sandbox components 704 and the like. The signatures can be in the form of MD5 hashes or the like. The server 710 is configured to enforce policy based on configuration, to log transactions to the data store 712 with information included therein such as policy reason and Threat category/super category information, and to send BA content to the BA infrastructure (specifically the server 720). In an embodiment, the server 710 can be the cloud node 102, etc. That is, the server 710 is generally performing inline traffic processing between a user and another domain mechanisms as a cloud-based system (security-as-a-service).

The server 710 can perform various aspects of inline traffic processing such as virus detection and prevention, malware detection and prevention, data leakage prevention, policy enforcement, etc. The focus here is on malware detection and prevention, but it is expected that the server 710 also provides other security functions. As described herein, malware includes code, scripts, active content, and other software that is used to disrupt computer operation, gather sensitive information, and/or gain access to private computer systems. That is, malware is active software installed on a user's device for malicious purposes and can include executable files (e.g., .EXE), Dynamic Link Libraries (DLL), documents (e.g., .DOCX, .PDF, etc.), etc. The server 710, in conjunction with the server 720, can include a set of known malware that is detected and precluded. However, as malware is constantly evolving, there is a need to detect quickly (zero-day/zero-hour protection) new malware files. This is the objective of the BA infrastructure—to sandbox potential files for malware BA and to update the set of known malware based thereon.

The operational method 800 starts and determines if a BA policy applies (step 802). The BA policy determines whether or not processing for a particular user, company, set of users, etc. utilizes the BA infrastructure. Note, the BA policy does not mean whether or not the server 710 scans for known malware; rather the BA policy determines whether the server 710 performs BA on unknown files that could possibly be malware to detect new malware and add to the list of known malware. If there is no BA policy (step 802), the operational method 800 performs regular traffic processing (step 804). The regular traffic processing can include the various techniques and processes described herein for security in the cloud, and the operational method 800 stops (step 806). If there is a BA policy (step 802), the operational method 800 checks if the content is suspicious (step 808). Content may be suspicious, from a malware perspective, if it is unknown, active software that performs some functionality on the user's device. Determining the content is suspicious can be based on smart filtering that performs a quick analysis inline in the cloud. If the content is not suspicious (step 808), the operational method 800 checks if the content is already classified by the BA or another system (step 810), and if so, the operational method 800 makes a log transaction for the content with a policy reason as BA (step 812). If the content is not already classified (step 810), the operational method 800 performs the regular traffic processing (step 804).

If the content is suspicious (step 808), the operational method 800 checks whether the policy is to block or not (step 814). Note, suspicious content may or may not be malware; it is the purpose of the BA infrastructure (e.g., the sandbox components 704) to determine this. However, the operational method 800 can allow or block the suspicious content (while also sending the suspicious content to the BA infrastructure. If the policy is not to block (step 814), the operational method 800 sends the content to the BA infrastructure (e.g., the sandbox components 704 for performing the functionality in FIGS. 7 and 8) (step 816). Next, the operational method 800 performs regular traffic processing (step 818) (same as step 804), the operational method 800 logs the transaction as a policy reason BA allow (step 820), and the operational method 800 ends (step 822). If the policy is to block (step 814), the operational method 800 blocks the content and shows the user a block page (step 824). The block page notifies the user that the content was suspicious and blocked. The operational method 800 sends the content to the BA infrastructure (e.g., the sandbox components 704 for performing the functionality in FIGS. 7 and 8) (step 826), the operational method 800 logs the transaction as a policy reason BA block (step 820), and the operational method 800 ends (step 822).

The UI 714 provides the ability to configure policy at the company level, or at some set or subset of users, with features that are enabled/disabled using a few checkboxes, for example. The UI 714 provides a high-level view of the BA system 700 for a company using specific BA reports, and the UI 714 provides the ability to view analysis details of any threat from transaction drill-downs. The data store 712 is configured to store transaction logs from the server 710, to provide counter infrastructure for all BA reports, and to provide querying infrastructure for BA transactions. For example, the data store 712 can add a new BA record and handle it in live/sync data paths, perform query module handling for this new BA record, also some new filters will be added for BA like MD5, perform BA counter handling, and the like. For example, the counter infrastructure can use the following dimensions:

| Dimension | Values |
|---|---|
| MalwareReason | One of the following values [Submitted, Benign, Suspicious, Adware, Malware, Anonymizer] |
| Direction | One of the following values [Inbound, Outbound] |
| Action | Allowed, Blocked |

The UI 714 can provide various reports such as a combination of the following filters for drill-down:

| Chart Type | Drilldown Area |
|---|---|
| BA Actions | Blocked |
| BA Actions | Quarantined |
| BA Actions | Sent for Analysis |
| BA Categorization | Suspicious Behavior |
| BA Categorization | Botnet & Malware Behavior |
| BA Categorization | Adware Behavior |
| BA Categorization | Anonymizer Behavior |

FIG. 7 illustrates an operational method 802 performed by a gateway element in the BA infrastructure (e.g., the sandbox components 704), such as the server 720. The server 720 is a critical component in the BA architecture that integrates all the other subsystems; it is the central authority for all things involved with BA. The server 720 (or gateway to the BA infrastructure) has the following functional components a Secure Storage Engine (SSE), a Static Analysis Engine (SAE), a Dynamic Analysis Scheduling Engine (DASE), a Database Engine, a Scoring Engine, and a Reporting Engine. The SSE is responsible for the persistent storage of the BA Content to be analyzed. The results of the analysis is stored in the SSE, as well. All data related to the customers are stored in encrypted format using symmetric keys (e.g., AES256). The encryption keys are generated (well in advance) at regular intervals. The encryption keys are not stored in SSE. They are retrieved at runtime from the Certificate Management Server (currently Central Authority [SMCA] in the sandbox components 704), i.e. they are retrieved at runtime on the server 720 for use. The SSE can store an activity ledger for all that has happed for the content which various events recorded, such as what happened to the content? what state is the content in? and, in case of a crash, to continue processing the content from where it was left off. Example events can include storing the content, completing a static analysis of the content, starting a dynamic analysis of the content, completing the dynamic analysis of the content, calculating a final score for the content, and modifying the score of the content. The SSE can also store results data at various stages of analysis of the content, such as Static Analysis Results, JavaScript Object Notation (JSON) data from the Dynamic Analysis, Packet Capture Data, Screenshot Images, and Files created/deleted/downloaded during the sandbox analysis.

The BA infrastructure generally uses two techniques to evaluate unknown content to detect malware—Static Analysis and Dynamic Analysis—and results of the two are scored to determine whether or not the unknown content is malware. Generally, the Static Analysis looks at various properties of the unknown content, whereas the Dynamic Analysis actually runs the unknown content. The SAE analyzes the unknown content for known signatures (benign or malicious) using a set of tools based on the type of the file. Some example tools include:

VirusTotal: Using a Web Application Programming Interface (API), the MD5 of the unknown content is sent to a third-party service to check for known viruses as determined by various anti-virus (AV) engines;
  YARA tool: Using a Perl Compatible Regular Expressions (PCRE) engine, the unknown Content is analyzed for known signatures. The signatures are sourced from various third-party services as well as internally developed by the operators of the distributed security system 100;
  Certificate Analysis: Using Portable Executable (PE)/Common Object File Format (COFF) specifications, identify the code signing certificates to form a whitelist of known benign content; and
  Zulu (available from zscaler.com): Using the URL Risk Analyzer, the original URL as well as the IPs and URLs resulting from the Dynamic Analysis are further analyzed.

Basically, the SAE looks for known attributes that could lead the unknown content to be malware—such as previously detected signatures, detecting known malware signatures, analyzing the source of the unknown content, etc.

The DASE schedules the Dynamic Analysis, which is performed by the BA controller 722 and VM server 726. The Dynamic Analysis can be referred to as sandboxing where the unknown content is thrown into a "sandbox," i.e., the VM server 726, and run to see what happens. The DASE is configured to schedule the unknown content within the limitations of the Sandboxing Infrastructure (i.e., the BA controller 722 and the VM server 726). The DASE can act as queuing manager and scheduler. After static analysis, unknown content can be queued based on priority (known viruses get lower priority), availability, and content type. For example, if an unknown content is identified as a Windows executable/DLL it needs to be sent to the BA Controller 722 which uses a Windows guest Operating System (OS), if an unknown Content is identified an Android application package file (APK), it needs to be sent to the BA controller 722 which uses an Android OS, etc.

The Database Engine is used to maintain a view of data as stored in the SSE. Customer-centric data that requires to be stored in an encrypted format may not be stored in the database. This is a temporary arrangement for quicker access to preformatted data for research purposes. The database tables can be designed in such a way so as to avoid row updates (as much as possible) during runtime. In case of any conflicts with the data in the SSE, the SSE can be the authority, and the view in database can be recreated at any point from the data in the SSE. The Scoring Engine is for analyzing the results using a configurable scoring sheet to arrive at a final score for the unknown content once all of the Behavioral Analysis is complete. For example, the Scoring Sheet is a file serialized in JSON format that provides individual scores for various components in the analysis. The Reporting Engine provides a querying interface for the BAUI 724 to display the required results of the Behavioral Analysis to the user. The results for the commands can be retrieved from one of the following sources: Information available in memory (cache) score, category, etc.; Information available in disk (SSE), packet captures, screenshots, etc.; Information available in the database Protocol Information (HTTP/SMTP), etc.; and any combination thereof.

The server 720 interfaces to the server 710 (receiving BA content from the server 710 and sending BA signatures to the server 710), the BAUI 724 (sending BA results to the BAUI 724 and receiving BA requests from the BAUI 724), and the BA controller 722 (queuing a Dynamic Analysis by the BA controller 722 and receiving Dynamic Analysis results from the BA controller 722). The operational method 802 starts, such as at startup of the server 720, and waits for new BA content (steps 850, 852). The operational method 802 stores new content in the SSE (step 854), and performs the Static Analysis (SA) (step 856). The operational method 802 stores the SA results in the SSE (step 858) and schedules the BA content for Dynamic Analysis (DA) with the BA controller 722 (step 860). The operational method 802 waits for completion of the DA (steps 862, 864). The operational method 802 receives results of the DA from the BA controller 722 (step 866).

Next, the operational method 802 can perform a static analysis for file system changes in the DA (step 868). Here, the operational method 802 is looking to see what changes the BA content made when executed or opened in the DA. The operational method 802 stores the DA results in the SSE (step 870). The operational method 802 calculates a final score for the BA content using all results—SA and DA (step 872). The final score can also be manually be modified if reviewed by operators of the BA system 700. The final score is stored in the SSE (step 874), the operational method 802 stores the results view in the database (step 876), and the operational method 802 ends (step 878).

FIG. 8 illustrates an operational method 804 performed by the BA controller 722 in the BA infrastructure (e.g., the sandbox components 704). The BA Controller 722 is the engine that controls the sandboxing environment. The sandbox is used to execute the BA content in a controlled VM environment, such as on the VM server 726. It then evaluates the file system changes, network activity, etc., to analyze the threat posed by the BA content. The BA controller 722 performs the following functions: Receives BA Content from the server 720 and sends it for execution (Dynamic Analysis (DA)) with one of the available VM guests on the VM server 726; accumulates all the pertinent results (results in JSON format, packet capture, screenshots, file system changes, etc.) from the DA and send them to the server 720; cleans up temporary files generated; and tracks CPU, network, memory and file system usages on the controller for monitoring. Note, the VM server 726 can be implemented on the BA controller 722 or in another device.

The operational method 804 starts and waits for BA content (steps 902, 904). The operational method 804 schedules received BA content for the Dynamic Analysis with a VM (step 906). The operational method 804 waits for completion of the DA (steps 908, 910). The operational method 804 accumulates results of the DA (e.g., packet capture (PCAP), screenshots, files, JSON, etc.). The operational method 804 sends the DA results to the server 720 (step 912), and the operational method 804 ends (step 916).

The VM server 726 provides a VM infrastructure for use by the BA Controller 722 for Dynamic Analysis. The VM server 726 can utilize conventional sandboxing functionality, and can operate all Windows-based systems (Windows XP, Windows 7 32/64 bit, Windows 8/8.1 32/64 bit, Windows 10, etc.) as well as Android, iOS, macOS, Linux, etc. The BAUI 724 is a web application deployed on a server in the sandbox components 704. It can also be deployed on separate hardware. It primarily provides the following functionality: provides a user interface for the detailed analysis of a BA Content, and provides a user interface for the Security Research team to manage the various threats.

Dynamic YARA

YARA is the name of a tool primarily used in malware research and detection that provides a rule-based approach to create descriptions of malware families based on textual or binary patterns. A description is essentially a YARA rule name, where these rules include sets of strings and a Boolean expression. The language used has traits of Perl compatible regular expressions.

The present disclosure provides an approach to enhance the detection capabilities of a cloud sandbox 101. At times there are cases where it is not possible to modify Sandbox signatures due to risk of False Negatives. The present disclosure can address the specific False Positive (FP) cases. Features of the present disclosure include Malware detection efficacy, Malware attribution, Dynamic scoring, Writing a YARA rule on unpacked Portable Executable (PE) files, and Dynamic chaining of cloud sandbox signatures.

The Portable Executable format is a file format for executables, object code, DLLs, FON Font files, and others used in 32-bit and 64-bit versions of Windows operating systems. The PE format is a data structure that encapsulates the information necessary for the Windows OS loader to manage the wrapped executable code.

The approach described herein includes three components—1) Dynamic YARA engine, 2) Dynamic YARA Python signature, and 3) Dynamic YARA rules.

Dynamic YARA Engine

The Dynamic YARA engine is part of the sandbox 101 and configured to generate events. Specifically, the Dynamic YARA engine collects data (hereafter referred to as dynamic data) from different sandbox events, with some examples listed in Table 1. These sandbox events provide dynamic and static information about the malware samples.

| Sandbox event name | Event data used | Field name in dynamic data | Example |
|---|---|---|---|
| staticgen | File extension (Extracted value) | staticgen:filetype: | staticgen:filetype:exe |
| sigid | ID of sandbox signatures hits | sigid: | sigid:767 |
| filedumps | Path of all dropped files. | filedump:path | filedump:path:C:\test.txt |
| windows | Title and Text of windows created | window:title:<br>window:text: | window:title:Setup<br>window:text:This is installer |
| dnsQuery | dnsQuery name | dnsquery:name: | dnsquery:name:google.com |
| staticOLEEntry | vbacodedeobfuscated data from Macro. | staticoleentry:vbacodedeobfuscated: | staticoleentry:vbacodedeobfuscated:Dim VBAMacro_code |
| processCreated | Path and command line value of all created processes. | processcreated:path:<br>processcreated:cmdline: | processcreated:path:C:\windows\mal.exe<br>processcreated:cmdline:C:\windows\system32\cmd.exe/c dir |
| memstrings | Memory strings | memstring:string: | memstring:string:Y..y.Hc.H..H.\|$8f.\ $0D.\$ L.T$ ......H. |
| mutantCreated | Mutex name: | mutantcreated:Name | mutantcreated:name:_!SHMSFTHISTORY!_ |
| http,littps,httpData | Header data and extracted other http request fields | http:header: | it includes both http and https. http:header:POST/ 59C9AEA632140C63AFA3D 7318940E42C6CA421A9C1 HTTP/1.1<br>Accept: */*<br>Content-Type: application/x-www-form-urlenco ded<br>User-Agent: Mozilla/5.0 Windows NT 6.1; WOW64; rv:25.0 Gecko/20100101 |
|  |  | http:rawdata: | Data sent or received in http request ( converted to hex) http:rawdata:80000000302460 cac85371cd92dcdf526430fd3b 8f9c2a3f7a5d39af41 |
| keyValueCreated | New registry key Path, | keyvaluecreated:path: | keyvaluecreated:path:HKEY_USERS\ Software\Microsoft\Off ice\ 12.0\Word |
|  | name and newdata created | keyvaluecreated:name:<br>keyvaluecreated:newdata: | keyvaluecreated:name:MTTT<br>New data added to registry key. Data can be ASCII/Unicode and binary (represented as hex string) keyvaluecreated:newdata:A40 30000C0CFA8B29444D30100 000000 keyvaluecreatedlnewdata:C:\ Windows\10923484211833438\ winfunx.exe |
| kevValueModified | Modified registry key path, name and newdata | keyvaluemodified:path: | keyvaluemodified:path:HKEY_USERS\ Software\Microsoft\Off |
|  |  | keyvaluemodified:name:<br>keyvaluemodified:newdata: | keyvaluemodified:name:ReviewToken<br>Modified data added to registry key. Data can be ASCII and binary (represented as hex string) keyvaluemodified:newdata:W HTMLControlEvents keyvaluemodified:newdata:0F 00000001000000140000071 75753454C2982E84ED48F5B 4EE5248 |

-continued

| Sandbox event name | Event data used | Field name in dynamic data | Example |
|---|---|---|---|
| memWritten, memAlloc, memProtect, memdumps | Details of memory area modified in the all monitored processes. | memwritten:value: | Memory data written/modified or extracted PE file content - hex string - memwritten:value:4D5A90000 300000004000000FFFF0000B8 |
| | | memwritten:valuele n: | Total length of memory memwritten:valuelen:4045 |
| | | memwritten:valuele nA: | Length of data written memwritten:valuelenA:400 |

Dynamic Data

Dynamic data is a collection or dump of all the data received from events, such as those mentioned in Table 1. For most of the events—(staticOLEEntry, HTTP, HTTPS, HTTP data, keyValueCreated, keyValueModified, memWritten, memAlloc, memProtect, memdumps) data is normalized/pre-processed before storing it in a dynamic data buffer.

The collected data can be stored in a special format. Different field names (derived from sandbox event names and value field names) cane used to represent event data, for example—staticgen:filetype: , sigid: etc. This helps in writing a YARA rule on the exact event data and to avoid False Positives. For example, the following YARA rule triggers if string "windows" is found in mutex (mutual exclusion) data only. Without "mutantcreated:name:" field, it could cause FP since "windows" string can be found in data of other events as well.

```
rule Win32_Testing_Rule1 : knownmalwareDS
{
strings:
$str1="mutantcreated:name:
windows" condition:
all of them
}
```

Unpacked PE File Extraction

Dynamic data also includes the content of unpacked PE files. Unpacked PE file data can be provided in a memwritten:value: field. This event also provides data written to other processes, such as using a Windows API—WriteProcessMemory and NtWriteProcessMemory. A PE file extraction method can extract an unpacked PE file for malware using remote process injection, process hollowing, or self-injection unpacking methods.

For extracting unpacked PE files from malware that uses process injection or process hollowing techniques, the Dynamic YARA engine uses the "memWritten" event of the sandbox 101. This event provides data written to any process memory. The Dynamic YARA engine only extracts memory data that has been written on other process memory area using WriteProcessMemory and NtWriteProcessMemory Windows APIs. If MZ string is found, full memory data will be added to dynamic data, else only first 746 bytes will be added. As is known in the art, an MZ string is an indication of an executable file in Windows.

For extracting unpacking files from memory dumps and self-injection unpacking, the Dynamic YARA engine can listen for "memAlloc," "memProtect," and "memdumps" sandbox events. "memAlloc" and "memProtect" events provide details about virtual memory modifications done by malware during execution in the sandbox 101 and "memdumps" provide memory dump files.

The following method can be used to extract an unpacked PE file:
1) Store virtual memory base address and length if virtual memory is allocated or virtual memory protection is changed using "VirtualAlloc," "VirtualProtect," "NtAllocateVirtualMemory," "NtProtectVirtualMemory." Windows APIs, respectively.
2) For each virtual memory base address, locate the corresponding memory dump file.
3) For each memory dump file found in step 2), read the first two bytes from offset zero and match with the "MZ" marker.
4) If the "MZ" marker found extract PE file using base address and length values collected in step 1).

To avoid duplication, the MD5 of all extracted PE files is stored and compared to determine if the PE file has been analyzed already.

Dynamic Data File and YARA Scanning

The dynamic data is stored in a file for scanning. The location of the dynamic data file is mentioned in a config.properties file (Table 2). In an embodiment, the maximum size limit for the dynamic data file is 100 MB.

The dynamic data file is scanned using a YARA command-line tool. For example, here is a syntax of the command— yara -f -g -s<dynamic_rule_file><dynamic_data_file>

Dynamic YARA Configuration Options

The following new configuration options are added for the Dynamic YARA engine. These config options are defined in config.properties file.

TABLE 2

Dynamic yara engine config options

| Config option | Default value | Comment |
|---|---|---|
| MAX_ZSYARABUFFERSIZEINMB | 100 MB | Max dynamic YARA data |
| MAX_ZSYARAPEDUMPSIZEINMB | 100 MB | Max memdump file size. |
| MAX_ZSYARAMEMWRITTENDUMPSIZEINMB | 100 MB | Max extracted PE file size. |

TABLE 2-continued

Dynamic yara engine config options

| Config option | Default value | Comment |
|---|---|---|
| ZSYARARULEPATH | — | Dynamic YARA rules file. |
| ZSYARADATAFOLDER | — | Dynamic YARA data file location. |
| ZSYARADEBUG | — | Debug flag, True to disable deletion |

Dynamic YARA Python Signature

A new Python signature is used in the Dynamic YARA approach. This new signature can merge Known Clean File detection and Known Malicious File detection Python signatures.

This new Python signature listens for "zsyarahit" and "sighits" events. "zsyarahit" provides details of dynamic YARA rules that hit on the dynamic data file. This signature decides about the dynamic YARA rule score based on the rule tag (discussed in the following section). It also collects contextual information about YARA rule hits. This information is shown in a BA UI report along with dynamic YARA rule names (FIG. 9). The maximum limit for contextual information can be 250 characters.

Dynamic YARA Rules

The Dynamic YARA rules can be ordinary YARA rules. A new YARA file—dynamic_ba_yara.yara—can hold the YARA rules.

The Dynamic YARA rules can use specific tag names. These tags control the type and score of the rule. There can be two types of dynamic YARA tags—knownclean and knowmalware, each with a specific score A knownclean tag is used for clean samples; it marks any sample as clean, regardless of the DA score. This can be done using special score "−127".

Here is an example YARA rule for knownclean:

```
rule Gen_Installer : knownclean
{
 strings:
  $sig_id="sigid:11004"//Known malicious MD5
  $dropped_file_count="filedump:path:"
  $pattern=/window:title:.{0,100}(setup|install|wizard).{0,100}\nwindow:text:.
  {0,1000}(next|back|close|exit|decline|accept|cancel)/ nocase
 condition:
  #dropped_file_count>3 and $pattern and not $sig_id
}
``` knownmalware tag have the following sub-tags, all these tags are used to detect malware. These tags also specify the score for the rule (Table 3).

TABLE 3

Dynamic YARA rule tags, order by priority

| Priority | Tag name | Score |
|---|---|---|
| 1 | knownclean | −127 |
| 2 | knownmalwareDS | Dynamic score |
| 3 | knownmalware | 127 |
| 4 | knownmalware40 | 40 |
| 5 | knownmalware20 | 20 |

TABLE 3-continued

Dynamic YARA rule tags, order by priority

| Priority | Tag name | Score |
|---|---|---|
| 6 | knownmalware10 | 10 |
| 7 | knownmalware0 | 0 |

The knownmalware tag is to mark any sample as malware (using special score 127) regardless of the DA score. Since there are more granular scoring tags, knownmalware tag is generally not used. All the other knownmalware tags add 40, 20, 10, or 0 scores to a DA score. In case of multiple dynamic YARA hits, priority mentioned in Table 3 is used, and the final score is added to DA.

The knownmalwareDS tag is a special tag that is used for dynamic scoring. This is used when there is a desire to adjust the score of a YARA rule automatically based on the DA score. The Dynamic YARA rule using this tag will always mark the sample as malware but add only the required score to DA. It can use the following method to decide the score (Table 4)—

TABLE 4

Dynamic score mapping

| DA Score | YARA rule score |
|---|---|
| 120 and above | 0 |
| 100-110 | 10 |
| 80-90 | 20 |
| 50-70 | 40 |
| 40 and less | 127 |

So, this helps in using the same dynamic YARA rule for attribution and detection. The knownmalwareDS tag is very useful for malware those anti-sandbox techniques or any downloader that was not able to download the payload.

Dynamic YARA Process

Figure 10:
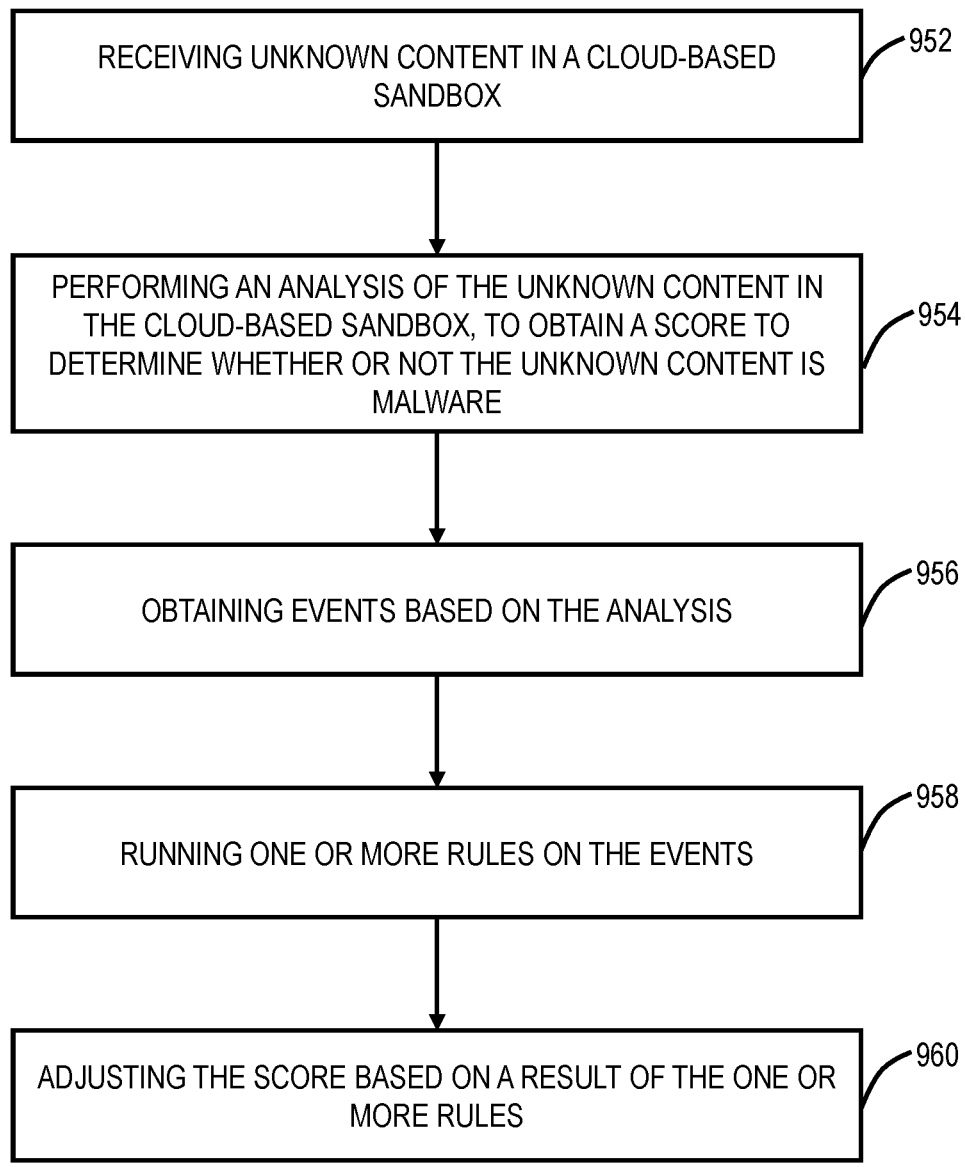
FIG. 10 is a flowchart of a process for dynamic rules in a cloud-based sandbox.

FIG. 10 is a flowchart of a process 950 for dynamic rules in a cloud-based sandbox. The process 950 can be a computer-implemented method, embodied as instructions in a non-transitory computer-readable medium, and implemented via the server 200. The process 950 includes receiving unknown content in a cloud-based sandbox (step 952); performing an analysis of the unknown content in the cloud-based sandbox, to obtain a score to determine whether or not the unknown content is malware (step 954); obtaining events based on the analysis (step 956); running one or more rules on the events (step 958); and adjusting the score based on a result of the one or more rules (step 960). The process 950 can further include classifying the unknown content as malware or clean based on the adjusted score.

The analysis can include a static analysis and a dynamic analysis. The events are generated during the static analysis and the dynamic analysis. The events can include any of file extension, signature hits, paths, title and text of windows created, DNS query names, processes created, memory information, mutex names, HTTP data, and registry information. The events can be processed and stored in a dynamic data buffer in a specific format, for processing by the one or more rules. The events can include content of unpacked files determined to be executable files. The adjusting can include a dynamic score for the one or more rules based on the score from the analysis.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming a cloud-based sandbox comprising one or more processor to perform steps of:
   receiving unknown content in the cloud-based sandbox that is located inline between devices associated with the unknown content;
   performing an analysis of the unknown content in the cloud-based sandbox, to obtain a score to determine whether or not the unknown content is malware;
   allowing the unknown content from the cloud-based sandbox responsive to a determination of the analysis that the unknown content is not malware;
   responsive to the determination of the analysis that the unknown content is malware, obtaining events based on the analysis;
   running one or more rules on the events; and
   adjusting the score based on a result of the one or more rules, classifying the unknown content as malware or clean based on the adjusted score, and allowing or blocking the unknown content based on the classifying.

2. The non-transitory computer-readable medium of claim 1, wherein the analysis includes a static analysis and a dynamic analysis.

3. The non-transitory computer-readable medium of claim 2, wherein the events are generated during the static analysis and the dynamic analysis.

4. The non-transitory computer-readable medium of claim 3, wherein the events include any of file extension, signature hits, paths, title and text of windows created, DNS query names, processes created, memory information, mutex names, HTTP data, and registry information.

5. The non-transitory computer-readable medium of claim 3, wherein the events are processed and stored in a dynamic data buffer in a specific format, for processing by the one or more rules.

6. The non-transitory computer-readable medium of claim 3, wherein the events include content of unpacked files determined to be executable files.

7. The non-transitory computer-readable medium of claim 3, wherein the adjusting includes a dynamic score for the one or more rules based on the score from the analysis.

8. The non-transitory computer-readable medium of claim 1, wherein a rule of the rules includes sets of strings and Boolean expressions, and wherein the rule is to address a determined False Positive score.

9. The non-transitory computer-readable medium of claim 1, wherein a rule of the rules includes a tag and a special score that is used in the adjusting the score either towards being clean or malware.

10. The non-transitory computer-readable medium of claim 9, wherein the rule is for detecting anti-sandbox techniques and the special score for the rule is set to mark any unknown content which triggers the rule as malware.

11. An apparatus comprising:
   a network interface;
   a data store;
   a processor communicatively coupled to the network interface and the data store;
   memory storing instructions that, when executed, cause the processor to:
      receive unknown content in a cloud-based sandbox that is located inline between devices associated with the unknown content;
      perform an analysis of the unknown content in the cloud-based sandbox, to obtain a score to determine whether or not the unknown content is malware;

allow the unknown content from the cloud-based sandbox responsive to a determination of the analysis that the unknown content is not malware;

response to the determination of the analysis that the unknown content is malware, obtain events based on the analysis, run one or more rules on the events; and adjust the score based on a result of the one or more rules, classify the unknown content as malware or clean based on the adjusted score, and allow or block the unknown content based on the classifying.

12. The apparatus of claim 11, wherein the analysis includes a static analysis and a dynamic analysis.

13. The apparatus of claim 12, wherein the events are generated during the static analysis and the dynamic analysis.

14. The apparatus of claim 13, wherein the events include any of file extension, signature hits, paths, title and text of windows created, DNS query names, processes created, memory information, mutex names, HTTP data, and registry information.

15. The apparatus of claim 13, wherein the events are processed and stored in a dynamic data buffer in a specific format, for processing by the one or more rules.

16. The apparatus of claim 13, wherein the events include content of unpacked files determined to be executable files.

17. A computer-implemented method comprising:

receiving unknown content in a cloud-based sandbox that is located inline between devices associated with the unknown content;

performing an analysis of the unknown content in the cloud-based sandbox, to obtain a score to determine whether or not the unknown content is malware;

allowing the unknown content from the cloud-based sandbox responsive to a determination of the analysis that the unknown content is not malware;

response to the determination of the analysis that the unknown content is malware, obtaining events based on the analysis;

running one or more rules on the events; and adjusting the score based on a result of the one or more rules, classifying the unknown content as malware or clean based on the adjusted score, and allowing or blocking the unknown content based on the classifying.

18. The computer-implemented method of claim 17, wherein the analysis includes a static analysis and a dynamic analysis.

19. The computer-implemented method of claim 18, wherein the events are generated during the static analysis and the dynamic analysis.

20. The computer-implemented method of claim 19, wherein the events include any of file extension, signature hits, paths, title and text of windows created, DNS query names, processes created, memory information, mutex names, HTTP data, and registry information.

* * * * *